US010295732B2

United States Patent
Zhang

(10) Patent No.: US 10,295,732 B2
(45) Date of Patent: May 21, 2019

(54) LIGHT GUIDE PLATE, BACKLIGHT MODULE AND DISPLAY MODULE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventor: Qi Zhang, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 15/970,855

(22) Filed: May 3, 2018

(65) Prior Publication Data
US 2019/0101692 A1    Apr. 4, 2019

(30) Foreign Application Priority Data

Sep. 29, 2017   (CN) ..................... 2017 2 1270589 U

(51) Int. Cl.
*G09F 13/04*       (2006.01)
*F21V 8/00*        (2006.01)
*G02F 1/1335*      (2006.01)

(52) U.S. Cl.
CPC .......... *G02B 6/0088* (2013.01); *G02B 6/0053* (2013.01); *G02B 6/0073* (2013.01); *G02B 6/0091* (2013.01); *G02F 1/133603* (2013.01)

(58) Field of Classification Search
None
See application file for complete search history.

(56) References Cited

U.S. PATENT DOCUMENTS

2007/0242473 A1* 10/2007  Lee .................... G02B 6/0096
                                                  362/551
2012/0008067 A1*  1/2012  Mun .................... G02B 6/003
                                                  349/65

* cited by examiner

*Primary Examiner* — Vip Patel
(74) *Attorney, Agent, or Firm* — Kinney & Lange, P.A.

(57) ABSTRACT

A light guide plate, a backlight module and a display module are disclosed. The light guide plate includes a light guide plate body. The light guide plate body includes a main portion and two end portions. The two end portions are at two opposite ends of the main portion. Each end portion includes a light incident surface.

19 Claims, 2 Drawing Sheets

LIGHT GUIDE PLATE, BACKLIGHT MODULE AND DISPLAY MODULE

CROSS-REFERENCE TO RELATED APPLICATION

This application is based on and claims the priority of the Chinese patent application No. 201721270589.2 filed on Sep. 29, 2017, which is incorporated herein by reference in its entirety.

TECHNICAL FIELD

The present disclosure relates to the field of display product manufacturing technology, and in particular to a light guide plate, a backlight module and a display module.

BACKGROUND

One way for improving brightness of a backlight source is to replace a white reflector film with an enhanced specular reflector (ESR) film. A reflectivity of a normal ESR film is about 15% higher than that of the white reflector film. Since a surface of the ESR film is a mirror surface, masking properties of the ESR film for white filaments and white dot particles is about 5% lower than that of the white reflector film. Thus, the ESR film can improve brightness but the yield of the backlight source decreases.

In addition, small sized LEDs may be adopted to increase the number of LEDs arranged in a light bar. However, as sizes of the LEDs decrease, the price of the LEDs will increase more. Meanwhile, as the size of each LED decreases, a junction temperature of each LED will rise, and then the risk of notebook overheating is increased as there are many LEDs in the whole light bar.

SUMMARY

One embodiment of the present disclosure provides a light guide plate including a light guide plate body. The light guide plate body includes a main portion and two end portions. The two end portions are at two opposite ends of the main portion; and each end portion includes a light incident surface.

Optionally, a thickness of the main portion is gradually decreased from a middle region of the main portion to an edge region of the main portion adjacent to each light incident surface.

Optionally, the main portion includes a light emitting surface and a first surface that is opposite to the light emitting surface; the light emitting surface is a plane surface, and the first surface is a curved surface.

Optionally, each end portion includes a first inclined surface and a second inclined surface; the first inclined surface and the light emitting surface are at an identical side of the main portion; the second inclined surface and the first surface are at an identical side of the main portion; the first inclined surface obliquely and outwardly extends from the light emitting surface in a direction away from the first surface; and the second inclined surface obliquely and outwardly extends from the first surface in a direction away from light emitting surface.

Optionally, the light guide plate further includes a plurality of dots in the light emitting surface. The plurality of dots are configured to converge light rays; at each edge region of the light emitting surface adjacent to each light incident surface, there are first areas and second areas that are alternately arranged; and a density of the dots in the first areas is greater than a density of the dots in the second areas.

Optionally, the end portion includes a first inclined surface and a second inclined surface; the first inclined surface and the light emitting surface are at an identical side of the main portion; the second inclined surface and the first surface are at an identical side of the main portion; the first inclined surface extends obliquely upwardly and outwardly from the light emitting surface; and the second inclined surface extends obliquely downwardly and outwardly from the first surface.

Optionally, each light incident surface is between the first inclined surface and the second inclined surface of each end portion corresponding to the each light incident surface; and each light incident surface is connected with both of the first inclined surface and the second inclined surface of each end portion corresponding to the each light incident surface.

Optionally, each light incident surface is obliquely disposed between the first inclined surface and the second inclined surface of each end portion corresponding to the each light incident surface.

Optionally, each light incident surface extends obliquely downwardly and outwardly from the first inclined surface of each end portion corresponding to the each light incident surface to the second inclined surface of each end portion corresponding to the each light incident surface.

Optionally, each end portion has a shape of a trumpet.

One embodiment of the present disclosure provides a backlight module including a light guide plate body and two light bars. The light guide plate body includes a main portion and two end portions; the two end portions are at two opposite ends of the main portion; and each end portion includes a light incident surface. The two light bars are at the two light incident surfaces of the light guide plate body, respectively.

Optionally, each light bar includes a plurality of point light sources and the point light sources of the two light bars are alternately arranged.

Optionally, the main portion includes a light emitting surface and a first surface that is opposite to the light emitting surface; the backlight module further includes a wedge-shaped connector at one side of each light bar away from the light incident surface. The wedge-shaped connector has an inclined surface in contact with the corresponding light bar; an area of one end of the wedge-shaped connector corresponding to the first surface is less than an area of another end of the wedge-shaped connector corresponding to the light emitting surface; the light incident surface is parallel to a plane where the light bar is in.

Optionally, the light guide plate further includes a plurality of dots in the light emitting surface. The plurality of dots are configured to converge light rays; at each edge region of the light emitting surface adjacent to each light incident surface, there are first areas and second areas that are alternately arranged; a density of the dots in the first areas is greater than a density of the dots in the second areas. The first area is corresponding to a bright area formed by superimposed light rays emitted from adjacent point light sources of the light bars; and the second area is corresponding to dark areas formed by superimposed light rays emitted from adjacent point light sources of the light bars.

Optionally, the wedge-shaped connector is made of Silica gel.

Optionally, the backlight module further includes a backplane enclosing an outer of the light guide plate and the light bars. A cross section of the backplane at each side corresponding to each light bar has a U-shaped structure.

Optionally, the main portion includes a light emitting surface and a first surface that is opposite to the light emitting surface; the light emitting surface is a plane surface, and the first surface is a curved surface. Each end portion includes a first inclined surface and a second inclined surface; the first inclined surface and the light emitting surface are at an identical side of the main portion; the second inclined surface and the first surface are at an identical side of the main portion; the first inclined surface extends obliquely upwardly and outwardly from the light emitting surface; and the second inclined surface extends obliquely downwardly and outwardly from the first surface. Each light incident surface is between the first inclined surface and the second inclined surface of each end portion corresponding to the each light incident surface; and each light incident surface is connected with both of the first inclined surface and the second inclined surface of each end portion corresponding to the each light incident surface.

Optionally, each light incident surface extends obliquely downwardly and outwardly from the first inclined surface of each end portion corresponding to the each light incident surface to the second inclined surface of each end portion corresponding to the each light incident surface.

One embodiment of the present disclosure provides a display module including the above backlight module.

One embodiment of the present disclosure provides a display device including the above display module.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
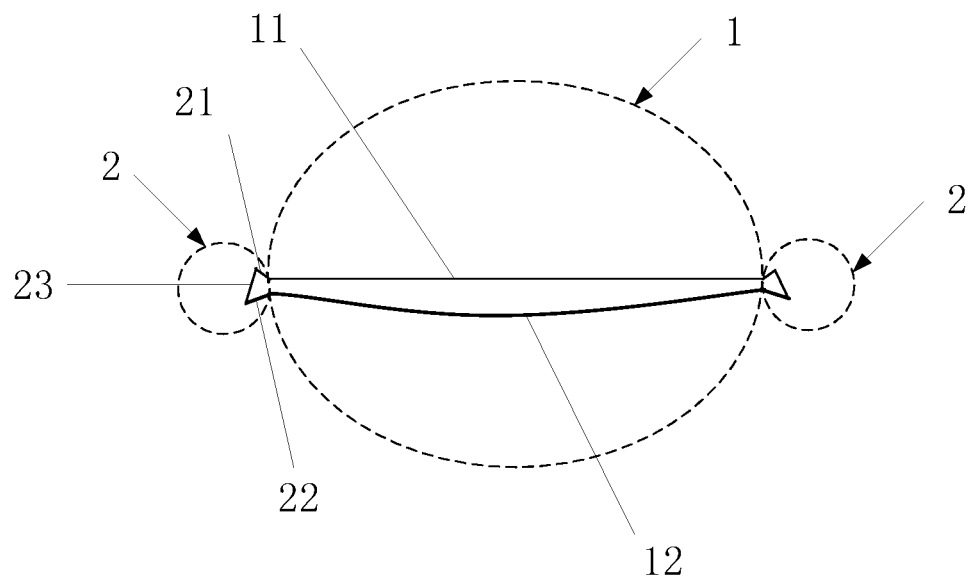
FIG. 1 is a schematic view of a light guide plate according to an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

Referring to FIG. 1 to FIG. 4, one embodiment of the present disclosure provides a light guide plate. The light guide plate includes a light guide plate body. The light guide plate body includes a main portion 1 and two end portions 2. The main portion 1 may be a middle portion of the light guide plate body. The two end portions 2 are at two opposite ends of the main portion 1. Each end portion 2 includes a light incident surface 23. A thickness of the main portion 1 is gradually decreased from a middle region of the main portion 1 to an edge region of the main portion 1 adjacent to each light incident surface 23.

The present of the two light incident surface 23 enables arrangement of two light bars 4, thereby improving brightness of a backlight module including the above light guide plate. Since the number of light bars 4 is increased and the two light bars 4 are at two sides rather one side of the light guide plate, point light sources 41 of a relative large size may be adopted in each light bar 4 and a distribution density of the point light sources 41 in each light bar may be low. In this way, the light guide plate of one embodiment of the present disclosure can solve the problem that LEDs at the light bars in the related art are of small sizes and the junction temperature of each LED will rise. Further, the light guide plate of one embodiment of the present disclosure can reduce the risk of overheating caused due to a high distribution density of LEDs at the light bars in the related art.

According to the principle that when light propagates in the same medium, in case of ignoring scattering and absorption, luminous flux at any cross-section of a propagation path remains unchanged, the thickness of the main portion 1 is gradually decreased from the middle region of the main portion 1 to the edge region of the main portion 1 adjacent to each light incident surface 23, and two light bars 4 are provided at the two light incident surfaces 23. Then, the brightness of the backlight module equipped with the above light guide plate is further improved.

The thickness of the main portion 1 may be set according to actual needs. In one embodiment, optionally, the middle region of the main portion 1 has a thickness of 0.35 mm, and the thickness of the main portion 1 is gradually decreased from the middle region to each of the two sides, respectively. An illuminance is inversely proportional to a square of a distance, and is proportional to an area of a cross section of light irradiation. A vertical distance between a light emitting surface 11 and a first position at a first surface 12 of the main portion 1 is defined as y=K(R*R), where K is a coefficient which may be determined according to sizes of a display region as well as membrane structures of the backlight module, and R is a distance from the light bar 4.

In order to achieve the purpose of improving uniform of brightness of the backlight module, in one embodiment, the main portion 1 includes the light emitting surface 11 and the second surface 12 opposite to the light emitting surface 11. The light emitting surface 11 may be a plane surface, and the first surface 12 may be a curved surface.

In one embodiment, the end portion 2 includes a first inclined surface 21 and a second inclined surface 22. The first inclined surface 21 and the light emitting surface 11 are at an identical side of the main portion 1 (i.e., a top side of the main portion 1 when the light guide plate is at a position shown in FIG. 1). The second inclined surface 22 and the first surface 12 are at an identical side of the main portion 1 (i.e., a bottom side of the main portion 1 when the light guide plate is at a position shown in FIG. 1). The first inclined surface 21 obliquely and outwardly extends from the light emitting surface 11 in a direction away from the first surface 12. The second inclined surface 22 obliquely and outwardly extends from the first surface 12 in a direction away from light emitting surface 11. In other words, the first inclined surface 21 extends obliquely upwardly and outwardly from the light emitting surface 11; and the second inclined surface 22 extends obliquely downwardly and outwardly from the first surface 12.

The light incident surface 23 corresponding to each end portion 2 is a plane. In order to improve utilization ratio of light rays, when the light bars 4 are assembled to the light guide plate, it is needed to ensure that all light rays emitted from a light source such as the point light sources 41 of the light bars 4 can enter the light guide plate as much as possible.

As shown in FIG. 1, the end portion 2 may have a shape of a trumpet, thereby improving utilization ratio of light rays emitted from the light source and ensuring that the backlight module does not suffer from light leakage and other undesirable phenomena.

Figure 2:
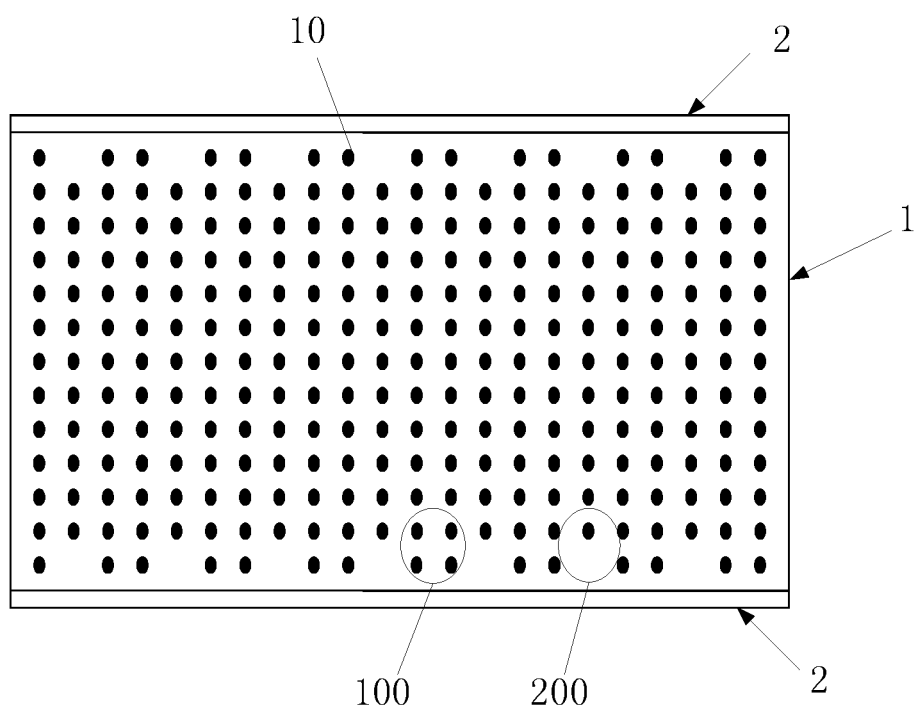
FIG. 2 is a schematic view showing distribution of dots in the light guide plate according to an embodiment of the present disclosure.
Figure 3:
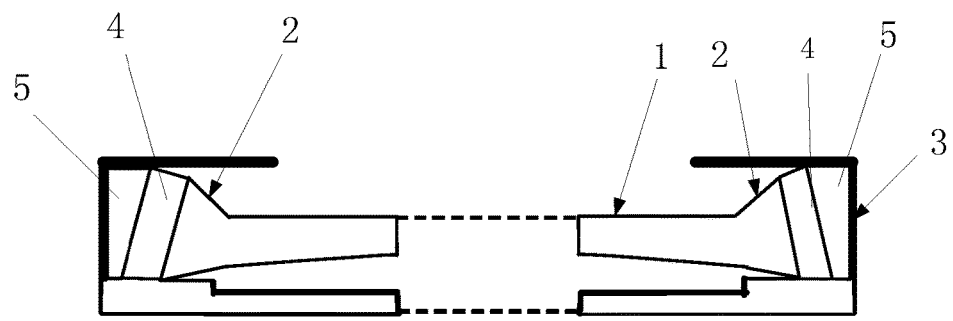
FIG. 3 is a schematic cross-sectional view of the light guide plate according to an embodiment of the present disclosure.

As shown in FIG. 2, in one embodiment, a plurality of dots 10 is provided in the light emitting surface 11 for converging light rays. At each edge region of the light emitting surface 11 adjacent to each light incident surface 23, there are first areas 100 and second areas 200 which are alternately arranged. The first area 100 is corresponding to a bright area formed by superimposed light rays emitted from adjacent point light sources 41 of the light bars 4. The second area 200 is corresponding to dark areas formed by superimposed light rays emitted from adjacent point light sources 41 of the light bars 4. A density of the dots 10 in the first area 100 is greater than a density of the dots 10 in the second area 200.

The densities of the dots 10 can distribute light rays emitted from the point light sources 41, thereby eliminating uneven light and dark phenomenon of the backlight module and then ensuring quality of the backlight source.

One embodiment of the present disclosure further provides a backlight module which includes the above light guide plate.

The present of the two light incident surface 23 enables arrangement of two light bars 4, thereby improving brightness of the backlight module. Since the number of light bars 4 is increased and the two light bars 4 are at two sides rather one side of the light guide plate, the point light sources 41 of a relative large size may be adopted in each light bar 4 and a distribution density of the point light sources 41 in each light bar may be low. In this way, the light guide plate can solve the problem that LEDs at the light bars in the related art are of small sizes and the junction temperature of each LED will rise. Further, the light guide plate can reduce the risk of overheating caused due to a high distribution density of LEDs at the light bars in the related art.

A thickness of the main portion 1 is gradually decreased from a middle region of the main portion 1 to an edge region of the main portion 1 adjacent to each light incident surface 23. Further, two light bars 4 are provided at the two light incident surfaces 23. Then, the brightness of the backlight module equipped with the above light guide plate is further improved.

Figure 4:
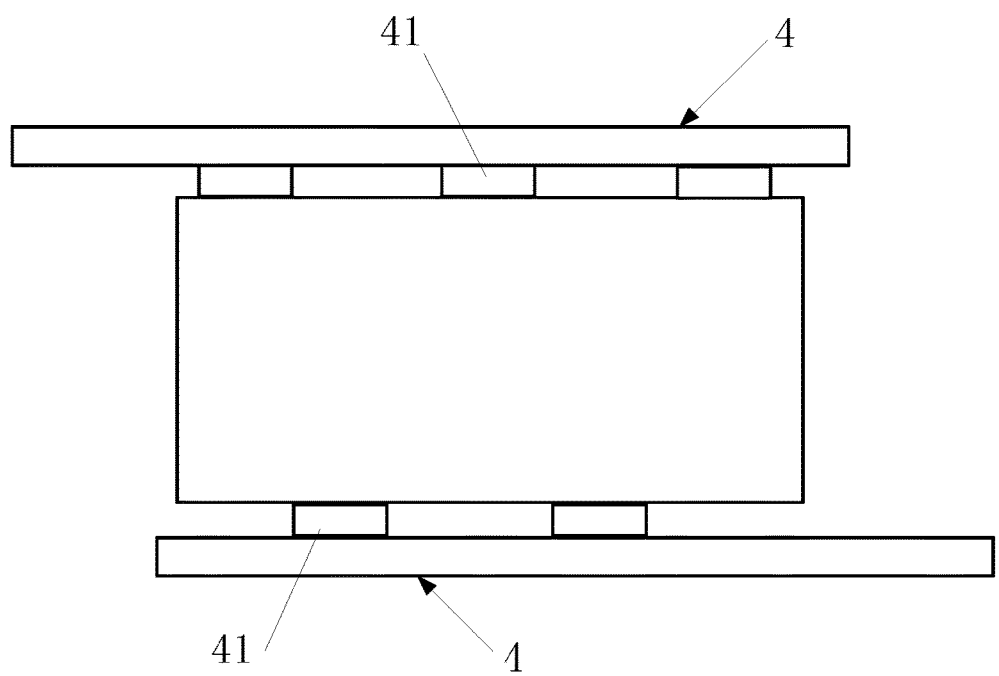
FIG. 4 is a schematic view showing the light guide plate being assembled to light bars according to an embodiment of the present disclosure.

In one embodiment, the light guide plate body includes two light incident surfaces 23 at two opposite ends of the light guide plate body. The backlight module includes two light bars 4 disposed at the two light incident surfaces 23, respectively. Each light bar 4 includes a plurality of point light sources 41. The point light sources 41 of the two light bars 4 are alternately arranged, as shown in FIG. 4.

Since the point light sources 41 of the two light bars 4 are alternately arranged, bright areas and dark areas formed by superimposed light rays emitted from adjacent point light sources 41 of the two light bars 4 can complement each other, thereby ensuring the uniform brightness of the backlight module.

In one embodiment, a wedge-shaped connector 5 is disposed at one side of each light bar 4 away from the light incident surface 23. The wedge-shaped connector 5 has an inclined surface in contact with the corresponding light bar 4. An area of one end (i.e., a bottom end of the wedge-shaped connector 5 when the light guide plate is at a position shown in FIG. 3) of the wedge-shaped connector 5 corresponding to the first surface 12 is less than an area of another end (i.e., a top end of the wedge-shaped connector 5 when the light guide plate is at a position shown in FIG. 3) of the wedge-shaped connector 5 corresponding to the light emitting surface. The light incident surface 23 is parallel to a plane where the light bar 4 is in.

The presence of the wedge-shaped connector 5 enables the light incident surface 23 to be obliquely disposed. Then, the light rays emitted from the point light sources 41 are incident at a certain angle to the main portion 1 of the light guide plate, thereby improving utilization ratio of the light rays and improving the brightness of the backlight module.

The light bar 4 may be in direct contact with the wedge-shaped connector 5. In order to prevent the light bar 4 from being damaged, in one embodiment, the wedge-shaped connector 5 may be made of elastic material.

The wedge-shaped connector 5 may be made of a variety of materials. The wedge-shaped connector 5 has a certain degree of elasticity for protecting the light bar 4. Meanwhile, the wedge-shaped connector 5 has a certain degree of toughness for keeping an inclination angle of the light bar 4 unchanged. Thus, even if the wedge-shaped connector 5 is deformed due to vibration or other reasons, the wedge-shaped connector 5 can return its original shape when an external force disappears. In one embodiment, the wedge-shaped connector 5 may be made of Silica gel.

In one embodiment, a plurality of dots 10 is provided in the light emitting surface 11 for converging light rays. At each edge region of the light emitting surface 11 adjacent to each light incident surface 23, there are first areas 100 and second areas 200 which are alternately arranged. A density of the dots 10 in the first area 100 is greater than a density of the dots 10 in the second area 200. The first area 100 is corresponding to a bright area formed by superimposed light rays emitted from adjacent point light sources 41 of the light bars 4. The second area 200 is corresponding to dark areas formed by superimposed light rays emitted from adjacent point light sources 41 of the light bars 4.

The densities of the dots 10 can distribute light rays emitted from the point light sources 41, thereby eliminating uneven light and dark phenomenon of the backlight module and then ensuring quality of the backlight source.

In one embodiment, the backlight module further includes a backplane 3 enclosing an outer of the light guide plate and the light bars 4. A cross section of the backplane 3 at each side corresponding to each light bar 4 has a U-shaped structure.

The backplane 3 fixes the two light bars 4, respectively. Meanwhile, the backplane 3 also fixes the light guide plate as well as the two wedge-shaped connectors 5 which are at left and right side of the light guide plate, respectively, thereby improving stability of the backlight module.

In one embodiment, the point light source 41 is a light emitting diode (LED).

On embodiment of the present disclosure further provides a display module including the above backlight module.

In accordance with market demands, the current development direction of the backlight module is ultrathin and high brightness. For example, the thickness of the backlight module is less than or equal to 0.8 mm, then the thickness of the light guide plate of the backlight module is less than or equal to 0.3 mm. in one embodiment, the thickness of the light guide plate is less than or equal to 0.3 mm, thereby enabling the thickness of the backlight nodule to be less than or equal to 0.8 mm and then improving market competitiveness of the backlight module for a liquid crystal display device.

The light emitting surface 11 may be a plane surface, and the first surface 12 may be a curved surface. The thickness of the main portion 1 is gradually decreased from a middle region of the main portion 1 to an edge region of the main portion 1 adjacent to each light incident surface 23, thereby improving the brightness of the backlight module.

One light bar can provide limit space for arranging LEDs and thus it is difficult to satisfy high brightness requirement of a display device with one light bar. In one embodiment, two light bars 4 are provided to improve brightness in addition to solving the problem of high density of LEDs at the light bar.

In order to ensure uniform of the brightness, the point light sources 41 of the two light bars 4 are alternately arranged.

The presence of the wedge-shaped connector 5 enables the light rays emitted from LEDs to be incident at a certain angle to the main portion 1 of the light guide plate, and enables the light incident surface 23 to be parallel to a plane where the light bar 4 is in, thereby improving utilization ratio of the light rays and improving the brightness of the backlight module.

The end portion 2 is provided with the first inclined surface 21 and the second inclined surface 22, and then the end portion 2 has a shape of a trumpet, thereby improving utilization ratio of light rays emitted from the LEDs and ensuring that the backlight module does not suffer from light leakage and other undesirable phenomena.

In one embodiment, a plurality of dots 10 is provided in each edge region of the main portion 1 adjacent to the light bar 4 and densities of the dots 10 is alternately changed in a direction perpendicular to a direction from one end portion 2 to the other end portion 2. The changed densities of the dots 10 can distribute light rays emitted from the LEDs, thereby eliminating uneven light and dark phenomenon of the backlight module and then ensuring quality of the backlight source.

The U-shaped structure of the backplane 3 fixes the two light bars 4, respectively. Meanwhile, the U-shaped structure of the backplane 3 also fixes the light guide plate as well as the two wedge-shaped connectors 5 which are at left and right side of the light guide plate, respectively, thereby improving stability of the backlight module.

The above are merely the optionally embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A light guide plate comprising:
a light guide plate body;
wherein:
the light guide plate body includes a main portion and two end portions;
the two end portions are at two opposite ends of the main portion; and
each end portion includes a light incident surface; and
wherein a thickness of the main portion is gradually decreased from a middle region of the main portion to an edge region of the main portion adjacent to each light incident surface.

2. The light guide plate of claim 1, wherein:
the main portion includes a light emitting surface and a first surface that is opposite to the light emitting surface;
the light emitting surface is a planar surface; and
the first surface is a curved surface.

3. The light guide plate of claim 2, wherein:
each end portion includes a first inclined surface and a second inclined surface;
the first inclined surface and the light emitting surface are at an identical side of the main portion;
the second inclined surface and the first surface are at an identical side of the main portion;
the first inclined surface obliquely and outwardly extends from the light emitting surface in a direction away from the first surface; and
the second inclined surface obliquely and outwardly extends from the first surface in a direction away from light emitting surface.

4. The light guide plate of claim 2, further comprising a plurality of dots in the light emitting surface, wherein:
the plurality of dots are configured to converge light rays;
at each edge region of the light emitting surface adjacent to each light incident surface, there are first areas and second areas that are alternately arranged; and
a density of the dots in the first areas is greater than a density of the dots in the second areas.

5. The light guide plate of claim 2, wherein:
the end portion includes a first inclined surface and a second inclined surface;
the first inclined surface and the light emitting surface are at an identical side of the main portion;
the second inclined surface and the first surface are at an identical side of the main portion;
the first inclined surface extends obliquely upwardly and outwardly from the light emitting surface; and
the second inclined surface extends obliquely downwardly and outwardly from the first surface.

6. The light guide plate of claim 5, wherein:
each light incident surface is between the first inclined surface and the second inclined surface of each end portion corresponding to each light incident surface; and
each light incident surface is connected with both the first inclined surface and the second inclined surface of each end portion corresponding to each light incident surface.

7. The light guide plate of claim 6, wherein each light incident surface is obliquely disposed between the first inclined surface and the second inclined surface of each end portion corresponding to each light incident surface.

8. The light guide plate of claim 6, wherein each light incident surface extends obliquely downwardly and outwardly from the first inclined surface of each end portion corresponding to each light incident surface to the second inclined surface of each end portion corresponding to each light incident surface.

9. A light guide plate comprising:
a light guide plate body;
wherein:
the light guide plate body includes a main portion and two end portions;

the two end portions are at two opposite ends of the main portion; and
each end portion includes a light incident surface; and
wherein each end portion has a shape of a trumpet.

10. A backlight module comprising:
a light guide plate body; and
two light bars;
wherein:
the light guide plate body includes a main portion and two end portions;
the two end portions are at two opposite ends of the main portion; and
each end portion includes a light incident surface;
wherein the two light bars are at the two light incident surfaces of the light guide plate body, respectively;
wherein the main portion includes a light emitting surface and a first surface that is opposite to the light emitting surface;
wherein the light emitting surface is a planar surface; and
wherein the first surface is a curved surface.

11. The backlight module of claim 10, wherein each of the two light bars includes a plurality of point light sources, and the point light sources of the two light bars are alternately arranged.

12. The backlight module of claim 10, wherein:
the backlight module further includes a wedge-shaped connector at one side of each light bar away from the light incident surface;
the wedge-shaped connector has an inclined surface in contact with the corresponding light bar;
an area of one end of the wedge-shaped connector corresponding to the first surface is less than an area of another end of the wedge-shaped connector corresponding to the light emitting surface; and
the light incident surface is parallel to a plane in which the light bar is located.

13. The backlight module of claim 12, wherein the wedge-shaped connector is made of Silica gel.

14. The backlight module of claim 10, wherein:
the light guide plate further includes a plurality of dots in the light emitting surface;
the plurality of dots are configured to converge light rays;
at each edge region of the light emitting surface adjacent to each light incident surface, there are first areas and second areas that are alternately arranged;
a density of the dots in the first areas is greater than a density of the dots in the second areas;
the first area corresponds to a bright area formed by superimposed light rays emitted from adjacent point light sources of the light bars; and
the second area corresponds to dark areas formed by superimposed light rays emitted from adjacent point light sources of the light bars.

15. The backlight module of claim 10, further comprising a backplane enclosing an outer of the light guide plate and the light bars;
wherein a cross section of the backplane at each side corresponding to each light bar has a U-shaped structure.

16. The backlight module of claim 10, wherein:
each end portion includes a first inclined surface and a second inclined surface;
the first inclined surface and the light emitting surface are at an identical side of the main portion;
the second inclined surface and the first surface are at an identical side of the main portion;
the first inclined surface extends obliquely upwardly and outwardly from the light emitting surface; and the second inclined surface extends obliquely downwardly and outwardly from the first surface;
each light incident surface is between the first inclined surface and the second inclined surface of each end portion corresponding to the each light incident surface; and
each light incident surface is connected with both of the first inclined surface and the second inclined surface of each end portion corresponding to the each light incident surface.

17. The backlight module of claim 16, wherein each light incident surface extends obliquely downwardly and outwardly from the first inclined surface of each end portion corresponding to the each light incident surface to the second inclined surface of each end portion corresponding to the each light incident surface.

18. A display module comprising the backlight module of claim 10.

19. A display device comprising the display module of claim 18.

* * * * *